US011215287B2

(12) United States Patent
Haeusser et al.

(10) Patent No.: US 11,215,287 B2
(45) Date of Patent: Jan. 4, 2022

(54) HYDRAULIC ASSEMBLY, PARTICULARLY FOR SUPPLYING A BRAKE CIRCUIT OF A VEHICLE BRAKE SYSTEM WITH FLUID AT BRAKE PRESSURE

(71) Applicant: Robert Bosch GmbH, Stuttgart (DE)

(72) Inventors: Bernd Haeusser, Neckarwestheim (DE); Oliver Gaertner, Abstatt (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/853,035

(22) Filed: Apr. 20, 2020

(65) Prior Publication Data

US 2020/0370657 A1 Nov. 26, 2020

(30) Foreign Application Priority Data

May 25, 2019 (DE) ..................... 10 2019 207 686.6

(51) Int. Cl.
| | |
|---|---|
| *F16K 1/42* | (2006.01) |
| *F04B 53/10* | (2006.01) |
| *F04B 49/22* | (2006.01) |
| *F04B 11/00* | (2006.01) |
| *F04B 53/16* | (2006.01) |
| *B60T 17/02* | (2006.01) |
| *B60T 11/34* | (2006.01) |

(Continued)

(52) U.S. Cl.
CPC ................ *F16K 1/42* (2013.01); *B60T 11/34* (2013.01); *B60T 17/02* (2013.01); *F04B 11/0091* (2013.01); *F04B 49/225* (2013.01); *F04B 53/1032* (2013.01); *F04B 53/16* (2013.01); *B60T 8/368* (2013.01); *F04B 53/126* (2013.01); *F04B 53/166* (2013.01)

(58) Field of Classification Search
CPC ........ F16K 1/42; F04B 11/0091; F04B 53/16; F04B 53/166; F04B 53/126; F04B 53/1032; F04B 49/225; B60T 17/02; B60T 11/34; B60T 8/368
See application file for complete search history.

(56) References Cited

U.S. PATENT DOCUMENTS

| | | | | |
|---|---|---|---|---|
| 4,988,147 A | * | 1/1991 | Zirps | F04B 53/126 303/116.4 |
| 6,837,694 B2 | * | 1/2005 | Furuya | B60T 8/4031 417/273 |

(Continued)

FOREIGN PATENT DOCUMENTS

| | | |
|---|---|---|
| DE | 10 2010 040 157 A1 | 3/2012 |
| DE | 10 2011 075 518 A1 | 4/2012 |

(Continued)

*Primary Examiner* — Jessica Cahill
*Assistant Examiner* — Patrick C Williams
(74) *Attorney, Agent, or Firm* — Maginot, Moore & Beck LLP

(57) ABSTRACT

A hydraulic assembly, particularly for supplying a brake circuit of a vehicle brake system with fluid at brake pressure, includes a throttle element, which in the unpressurized state rests with an upper side on a first support and with an underside on a second support, the supports being formed on opposite sides of the gap. The throttle device advantageously dispenses with a spring element for axial pre-tensioning, is accordingly of compact and cost-effective construction and is moreover easy to assemble.

11 Claims, 1 Drawing Sheet

(51) Int. Cl.
*F04B 53/12* (2006.01)
*B60T 8/36* (2006.01)

(56) References Cited

U.S. PATENT DOCUMENTS

| | | | | |
|---|---|---|---|---|
| 2004/0166004 A1* | 8/2004 | Schmitt | ............... | F04B 11/0091 |
| | | | | 417/470 |
| 2006/0198738 A1* | 9/2006 | Schlitzkus | ............ | F04B 1/0421 |
| | | | | 417/312 |
| 2014/0147314 A1* | 5/2014 | Gaertner | ............. | F04B 11/0091 |
| | | | | 417/437 |

FOREIGN PATENT DOCUMENTS

| DE | 10 2011 079 876 A1 | 1/2013 |
|---|---|---|
| DE | 10 2014 220 368 A1 | 4/2016 |

* cited by examiner

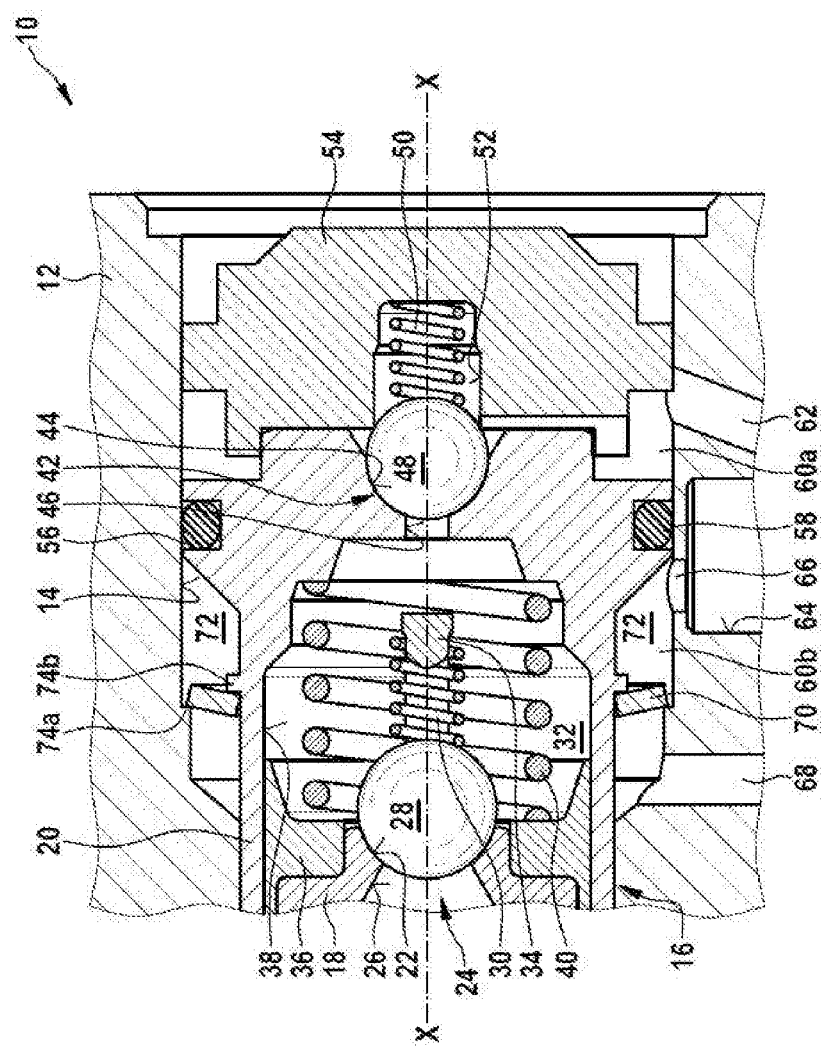

HYDRAULIC ASSEMBLY, PARTICULARLY FOR SUPPLYING A BRAKE CIRCUIT OF A VEHICLE BRAKE SYSTEM WITH FLUID AT BRAKE PRESSURE

This application claims priority under 35 U.S.C. § 119 to patent application no. DE 10 2019 207 686.6, filed on May 25, 2019 in Germany, the disclosure of which is incorporated herein by reference in its entirety.

BACKGROUND

The disclosure relates to a hydraulic assembly, particularly for supplying a brake circuit of a vehicle brake system with fluid at brake pressure.

Vehicle brake systems with electronic wheel slip control are sufficiently well known from the prior art. Forming the core of such vehicle brake systems is a so-called hydraulic assembly, in which, among other things, a pressure generator, a motor for driving this pressure generator, solenoid-operated valves and an electronic control unit for electrically activating these components are arranged on a housing block. The hydraulic assembly supplies wheel brakes, interconnected in brake circuits, with hydraulic fluid at brake pressure, with the facility, by means of the valves, for adjusting this brake pressure on individual wheels to the slip conditions prevailing on the respective wheels. The aim here, through targeted brake intervention, is to prevent the occurrence of wheel slip and resulting unstable driving conditions. Vehicle brake systems with wheel slip control are also known under many different names as antilock brake systems (ABS), traction control systems (TCS) or electronic stability programs (ESP).

For delivering the hydraulic fluid many different pressure generators are used, in which the fluid is delivered by pistons. The cyclical delivery of fluid by such pressure generators can lead to pressure pulsation in the connected brake circuits. This may be perceived as intrusive by occupants of the vehicle and may adversely affect the ride comfort.

A known method of damping pressure pulsation it to use damping devices on the pressure side of the pressure generators. These comprise a hydraulic cavity with a volume that can be varied as a function of the pressure, and a throttle device arranged downstream of this cavity. Throttle devices having a constant throttle cross section or with a cross section that can be varied as a function of the pressure are likewise counted part of the prior art. A distinctive feature of the latter is that they adjust their throttling characteristics to the volume of fluid delivered and/or to the prevailing pressure conditions.

A pressure generator having a damping device with a throttle cross section, variable as a function of the pressure and connected on the downstream side, is disclosed, for example, in DE 10 2011 075 518 A1.

DE 10 2010 040 157 A1 in addition discloses a pressure generator in which the throttle element is arranged on the outer circumference of this pressure generator. This throttle element is situated in a gap, which is formed between the pressure generator and a pump mounting on the housing block of the hydraulic assembly. It comprises a rigid throttle element of annular design, which is pressed against a valve seat by a spring element. The spring element is supported on a step on the circumference of the pressure generator; the valve seat is formed on the end face of a plug which faces the pump element and which closes the pump mounting off from the surroundings.

One disadvantage to this design is the multiplicity of separate components that have to fitted in various operations and the relatively large overall space taken up by this throttle device. Furthermore, the precision required in producing the individual parts of the throttle device is cost-intensive, if the resultant throttling characteristic is to lie within a desired tolerance range.

SUMMARY

The subject matter disclosed herein by contrast has the advantage that the throttle device completely dispenses with a spring element for pre-tensioning the throttle element. This is economical in terms of part and assembly costs and the overall space required to form the throttle device. The throttle element according to the disclosure interacts with two supports, which at no additional cost can be formed when producing the pump mounting on the housing block or when producing the cylinder sleeve. A pre-tensioning of the throttle element can be adjusted by varying an axial distance between the two supports and therefore allows easy adaptation of the throttling and damping characteristics to the particular applied application. A variation of the throttling characteristics can furthermore be achieved through the cross-sectional shape, the choice of material and/or the design configuration of the throttle element and the geometry of the supports. In general, an arrangement of the throttle element on the circumference of the piston pump and thereby away from the cavity of a damping device affords freedom in the design and in the process of assembling the hydraulic cavity.

Further advantages or advantageous developments of the disclosure emerge from the following description.

BRIEF DESCRIPTION OF THE DRAWINGS

An exemplary embodiment of the disclosure is represented in the drawing and is explained in detail in the following description.

FIG. 1 shows a detail of a longitudinal section through a hydraulic assembly of a vehicle brake system.

DETAILED DESCRIPTION

The detail of a hydraulic assembly 10 represented in the figure shows a housing block 12 with a pump mounting 14 formed thereon and open towards an outside of this housing block 12. The pump mounting 14 is of cylindrical design, extends in the direction of a longitudinal axis X-X and in its internal dimensions is repeatedly stepped from the outside inwards. A pressure generator 16, only part of which can be discerned in the figure, is inserted into this pump mounting 14. This pressure generator 16 is a piston pump, the piston 18 of which is displaceably received in a cylindrical cylinder liner 20 closed at one end and which can be driven to perform a to-and-fro reciprocating movement. A rotatably driven eccentric or cam, for example, which with its outer circumference acts on a piston head, serves as pump drive. The piston head and pump drive cannot be seen in the figure.

The only part of the piston 18 represented is an open end of a piston body situated opposite the piston head. A valve seat 22 of an inlet valve 24 is formed on this end. The valve seat 22 encloses an inlet valve cross section 26, which is controlled by an inlet valve ball 28. For this purpose, the inlet valve ball 28 is pressed against the valve seat 22 by an inlet valve spring 30. The inlet valve spring 30 is held under axial pre-tensioning between the inlet valve ball 28 and a pintle 34 projecting centrally into a working chamber 32 of the piston pump.

A high-pressure sealing element 36 is fixed to the outer circumference of the piston 18 in the area of the valve seat 22. This element is of annular design and by means of a circumferential sealing lip seals off a guide gap 38 between the piston 18 and an inside wall of the cylinder sleeve 20. A piston return spring 40 acts with one of its ends on the high-pressure sealing element 36 at an end facing the working chamber 32. The opposite end of the piston return spring 40 is supported on the closed end of the cylinder sleeve 20, and indirectly via the pressurized high-pressure sealing element 36 presses the piston 18 in the direction of the pump drive, not shown.

An outlet valve 42 of the piston pump is situated at the closed end of the cylinder sleeve 20. This outlet valve 42, also, is formed in the manner of a check valve. It comprises a conically shaped outlet valve seat 44, an outlet cross section 46 enclosed by the outlet valve seat 44, and a spring-loaded outlet valve ball 48 for controlling this outlet valve cross section 46. An outlet valve spring 50 is supported at the base of a valve spring seat 52 in the nature of a blind hole in the center of a plug 54 and with its opposite end presses the outlet valve ball 48 against the outlet valve seat 44.

The plug 54 closes the pump mounting 14 of the housing block 12 off from the surroundings. For this purpose, the plug 54 is pressed into the pump mounting 14 and in addition may be positively connected to the hydraulic assembly by caulking the material of the housing block 12.

A sealing ring 58 is arranged in a circumferential, outwardly open annular groove 56 in the area of the closed end of the cylinder sleeve 20. Inside the pump mounting 14 this sealing ring 58 seals off various annular chambers 60*a*; 60*b*, formed on the circumference of the pressure generator 16, from one another. A first annular chamber 60*a* faces the aperture of the pump mounting 14 closed by the plug 54. It has a fluid-carrying connection to the outlet valve 42 and serves to drain off fluid, displaced from the working chamber 32 by the piston 18, from the piston pump. For this purpose, a fluid duct 62, which in the figure runs obliquely, for example, emerges from the first annular chamber 60*a*.

The fluid delivered passes through this fluid duct 62 to a damping device, of which, however, only a damper installation space 64 in the housing block 12 is shown in the figure. In the figure this damper installation space 64 is located on the left, directly next to the first fluid duct 62. An outlet 66 from the damper installation space 64 opens out into the second annular chamber 60*b*, which as explained is sealed off from the first annular chamber 60*a* by the sealing ring 58 of the cylinder sleeve 20.

Downstream of the outlet 66 of the damping device in the direction of flow of the fluid, a fluid delivery duct 68 emerges from the second annular chamber 60*b*. The pressure generator 16 is connected to one of the brake circuits via this fluid delivery duct 68. In the figure, by way of example, the fluid duct 62, the outlet 66 and the fuel delivery duct 68 are arranged immediately next to one another on the same side of the pressure generator 16.

Between the point where the outlet 66 of the damping device opens into the second annular chamber 60*b* and that where the fluid delivery duct 68 emerges therefrom, a throttle element 70 is arranged on the circumference of the piston pump. This throttle element 70 is situated in a gap 72 or hollow space that exists between the outer circumference of the cylinder sleeve 20 and the inner circumference of the pump mounting 14. In hydraulic terms, the throttle element 70 is situated downstream of the installation space 64 for the cavity of the damping device and upstream of the fluid delivery duct 68 of the pressure generator 16. It interrupts a direct connection of the outlet 66 to the fluid delivery duct 68 and constitutes a flow resistance, which counteracts an unimpeded outflow of fluid from the cavity of the throttle device.

The throttle element 70 is designed, for example, as a closed annular disk having the upper side and the underside plane-parallel with one another. The outside and inside diameters of the annular disk are matched to the dimensions of the gap 72 between the cylinder sleeve 20 and the pump mounting 14, in such a way that the throttle element 70 is received in the gap 72 allowing movement in the direction of the longitudinal axis X-X of the pressure generator 16. The upper side of the throttle element 70 is situated on the side remote from the sealing ring 58 of the cylinder sleeve 20, whilst the underside is located on the side facing the sealing ring 58.

The throttle element is composed of an elastic material, preferably of spring steel or plastic.

With an edge area along the outer circumference of its upper side the throttle element 70 rests against a first support 74*a*. The latter is formed on the wall of the pump mounting 14 on the housing block 12, extends in a radial direction into the pump mounting 14 and in portions covers the throttle element 70 along its outer circumference. The first support 74*a* may extend along the entire inner circumference of the pump mounting 14, that is to say it may form a closed annular shoulder, or it may comprise multiple annular segments, which are each arranged at a distance from an adjacent annular segment.

A second support 74*b*, likewise extending into the gap 74 between the cylinder sleeve 20 and the inside wall of the pump mounting 14, is formed on the cylinder sleeve 20. This sleeve-side second support 74*b* extends along the inside diameter of the throttle element 70. It interacts with the underside of the throttle element 70 and in portions covers the edge area of the throttle element 70 along its inner circumference. The throttle element 70 is therefore arranged between the supports 74*a* and 74*b* and is held in position by the two supports 74*a*, 74*b*.

It should be pointed out that the arrangement disclosed with the sleeve-side second support 74*b* on the underside and the arrangement of the hydraulic block-side first support 74*a* on the upper side of the throttle element 70 it to be seen only as an example. If necessary, the arrangement of the supports 74*a*, 74*b* can be reversed.

The two supports 74*a* and 74*b* are axially separated from one another by a distance in the direction of the longitudinal axis X-X of the pressure generator 16. The distance here is designed to be smaller than the thickness of the throttle element 70, so that the throttle element 70 rests, concavely curved and with its inner and outer circumference, in each case under axial pre-tensioning, against the associated support 74*a* or 74*b*. The supports 74*a* and 74*b*, for example, protrude at right angles from the associated circumferential wall, so that a line contact occurs between the throttle element 70 and an edge of the supports 74*a*, 74*b* lying in the gap 72.

Fluid, which under pressure flows out of the damper installation space 64 into the second annular chamber 60*b*, meets the throttle element 70 and applies pressure to this. The acting pressure on the one hand presses the throttle element 70 with its outer circumference against the housing block-side first support 74*a*, and on the other hand, in the area of the inside diameter 70, acts on the throttle element 70 in such a way that this with its underside lifts off from the sleeve-side second support 74b. A throttle cross section thereby formed varies in its dimensions as a function of the pressure loading. It increases with a rising pressure load and decreases with a diminishing pressure load. Accordingly, a variable volume of fluid flows off through the throttle cross-section towards the fluid delivery duct 68 and the fall in pressure at the throttle element 70 varies correspondingly.

Modifications or additions to the exemplary embodiment described are obviously possible without departing from the disclosure.

The invention claimed is:

1. A hydraulic assembly comprising:
a housing block, the housing block defining a pump mounting with a fluid duct for delivering fluid into the pump mounting in a direction of flow and a fluid delivery duct downstream of the fluid duct in the direction of flow for delivering fluid from the pump mounting;
a pressure generator arranged in the pump mounting of the housing block; and
a damping device installation space arranged in the housing block downstream of the pressure generator in the direction of flow, the installation space configured to receive a hydraulic cavity of a damping device, the installation space including an outlet; and
a throttle element arranged upstream of the fluid delivery duct and downstream of the outlet, the throttle element being of annular design and arranged on a circumference of the pressure generator in a gap defined between the pressure generator and the pump mounting of the housing block,
wherein said throttle element is configured, in an unpressurized state, with an upper side resting only against a first support and with an underside resting only against a second support, the first and second supports being formed on opposite sides of the gap.

2. The hydraulic assembly according to claim 1, wherein:
the first support is formed on an inside wall of the pump mounting; and
the second support is formed on the circumference of the pressure generator.

3. The hydraulic assembly according to claim 2, wherein the circumference of the pressure generator on which the second support is formed is a cylinder sleeve circumference of a cylinder sleeve of the pressure generator.

4. The hydraulic assembly according to claim 1, wherein:
said gap is an annular gap;
each of the first and second supports projects in a radial direction into the gap; and
each of the first and second supports covers a corresponding edge area of the throttle element along an inner circumference or an outer circumference of the throttle element.

5. The hydraulic assembly according to claim 4, wherein the first and second supports are non-overlapping in the radial direction.

6. The hydraulic assembly according to claim 1, wherein, in a fitted state of the pressure generator in the pump mounting, the first and second supports are axially separated from one another by a distance in a direction of the pump longitudinal axis in such a way that the throttle element lying between the first and second supports rests with axial pre-tensioning against the first and second supports.

7. The hydraulic assembly according to claim 6, wherein:
the throttle element has a thickness between said upper side and said underside; and
said distance that the first and second supports are axially separated from one another is less than said thickness.

8. The hydraulic assembly according to claim 1, wherein the outlet of the damping device installation space and the throttle element of the damping device are each directly connected to the same one of two annular chambers on the hydraulic assembly, the two annular chambers being sealed off from one another.

9. The hydraulic assembly according to claim 1, wherein the throttle element is at least one of (i) formed of elastically resilient design and (ii) produced from elastically resilient material.

10. The hydraulic assembly according to claim 9, wherein the throttle element is produced from elastically resilient spring steel or plastic.

11. The hydraulic assembly according to claim 1, wherein the hydraulic assembly is configured to supply a brake circuit of a vehicle brake system with fluid at brake pressure.

* * * * *